United States Patent
Inoue et al.

(10) Patent No.: US 8,339,908 B2
(45) Date of Patent: Dec. 25, 2012

(54) OPTICAL RECORDING-READING METHOD AND OPTICAL RECORDING MEDIUM

(75) Inventors: Motohiro Inoue, Tokyo (JP); Takashi Kikukawa, Tokyo (JP); Atsuko Kosuda, Tokyo (JP); Hideki Hirata, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/032,221

(22) Filed: Feb. 22, 2011

(65) Prior Publication Data

US 2011/0205869 A1     Aug. 25, 2011

(30) Foreign Application Priority Data

Feb. 22, 2010 (JP) ................. 2010-035810

(51) Int. Cl.
*G11B 7/00* (2006.01)
*G11B 7/24* (2006.01)

(52) U.S. Cl. ............. 369/44.26; 369/279; 369/280; 369/44.25

(58) Field of Classification Search ..... 369/275.1–275.4, 369/283, 112.23, 94, 44.26, 44.27
See application file for complete search history.

(56) References Cited

U.S. PATENT DOCUMENTS

| | | | | |
|---|---|---|---|---|
| 2001/0024410 A1* | 9/2001 | Kumai et al. | ............. | 369/47.24 |
| 2008/0137494 A1* | 6/2008 | Trautner et al. | ............. | 369/44.26 |
| 2009/0316537 A1* | 12/2009 | Nakatani et al. | ............. | 369/44.14 |
| 2011/0075545 A1* | 3/2011 | Nagatomi et al. | ............. | 369/112.23 |

FOREIGN PATENT DOCUMENTS

| | | |
|---|---|---|
| JP | 2008097693 A | 4/2008 |
| JP | 2008097694 A | 4/2008 |
| JP | 2008108383 A | 5/2008 |

OTHER PUBLICATIONS

Ichimura et al., "Proposal for a Multilayer Read-Only-Memory Optical Disc Structure", Applied Optics 45 (8):1794-1803 (2006).
Mishima et al., "150 GB, 6-Layer Write Once Disc for Blu Ray Disc System", Proc. of SPIE 6282 628201-1-628201-11 (2006).

* cited by examiner

*Primary Examiner* — Wayne Young
*Assistant Examiner* — Dionne Pendleton
(74) *Attorney, Agent, or Firm* — Porzio, Bromberg & Newman, P.C.

(57) ABSTRACT

An optical recording and reading method is provided in which the information necessary for recording and reading layers is quickly acquired to reduce the seek time during reading and recording. The optical recording and reading method is used for an optical recording medium that includes a plurality of recording and reading layers and a servo layer. Information is recorded on or read from the recording and reading layers by irradiating them with a recording and reading beam while the servo layer is irradiated with a servo beam to perform tracking control. When information is recorded on the recording and reading layers, control information necessary for subsequent recording and reading to be performed on the recording and reading layers is recorded on the servo layer 18. When the subsequent recording or reading is performed, the control information on the servo layer is consulted, and then the recording or reading is performed on the recording and reading layers.

17 Claims, 5 Drawing Sheets

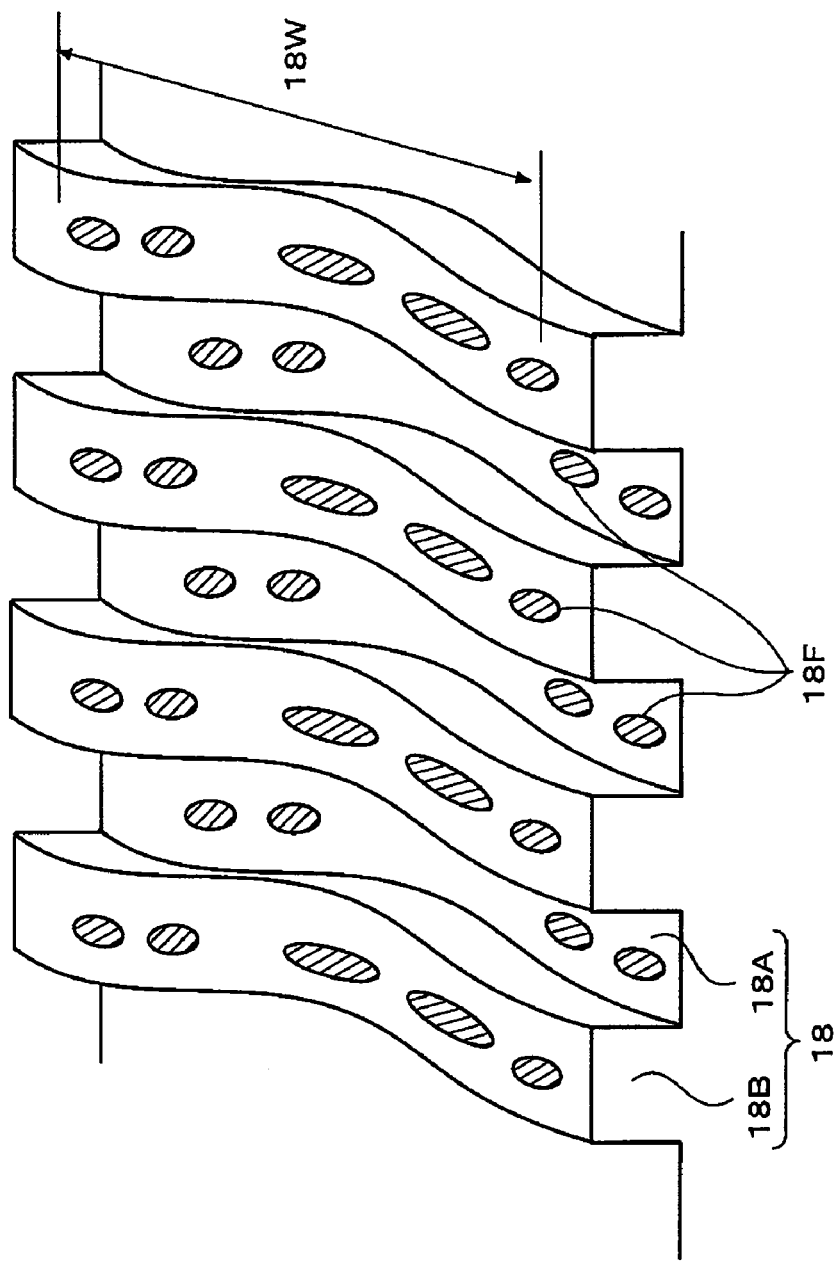

OPTICAL RECORDING-READING METHOD AND OPTICAL RECORDING MEDIUM

BACKGROUND OF THE INVENTION

1. Field of the Invention

The present invention relates to an optical recording and reading method for an optical recording medium including a plurality of recording and reading layers and to the optical recording medium.

2. Description of the Related Art

Conventionally, optical recording media such as CD-DAs, CD-ROMs, CD-Rs, CD-RWs, DVD-ROMs, DVD-Rs, DVD+/−RWs, DVD-RAMs, Blu-ray Discs (BD) are widely used to view digital video contents and to record digital data. In the BD standard, which is one of the next generation DVD standards, the wavelength of the laser beam used for recording and reading is reduced to 405 nm, and the numerical aperture of an objective lens is set to 0.85. In optical recording media conforming to the BD standard, tracks are formed at 0.32 µm pitch. This enables 25 GB or more data to be recorded on and read from one recording and reading layer of such an optical recording medium.

It is expected that the size of video and data files will increase more and more in the future. Therefore, it is contemplated to increase the capacities of optical recording media by using a multiple stack of recording and reading layers. In the technologies for BD standard optical recording media reported by I. Ichimura et al., Appl. Opt., 45, 1974-1803 (2006) and K. Mishima et al., Proc. of SPIE, 6282, 62820I (2006)6 to 8 recording and reading layers are provided to achieve ultra large capacities as much as 200 GB.

When a multiple stack of recording and reading layers is used in an optical recording medium, projections and depressions, such as grooves and lands, for tracking control are formed on each recording and reading layer, and therefore a stamper (a master die) must be used to form the projections and depressions each time a recording and reading layer is formed. Therefore, as the number of stacked layers increases, the number of times the stamper is used increases, and this may result in an increase in manufacturing cost.

In the technologies for optical recording media recently proposed in Japanese Patent Application Laid-Open Nos. 2008-97693, 2008-97694, and 2008-108383, servo layers are provided separately from recording and reading layers, and information is recorded on each recording and reading layer using a recording laser beam while a tracking signal is obtained from a corresponding one of the servo layers using a servo laser beam. With such technologies, the recording and reading layers need not have projections and depressions (grooves) for tracking information, and a stamper need not be used for the recording and reading layers during manufacturing. This enables a significant reduction in cost.

In the optical recording media described in Japanese Patent Application Laid-Open Nos. 2008-97693, 2008-97694, and 2008-108383, content information and other information, in addition to address information, are added to the data recorded on the recording and reading layers so that the recorded data can be read using only recording marks formed on the recording and reading layers.

However, in this case all the recording and reading layers must be consulted to check the contents recorded on each recording and reading layer. Therefore, when the number of recording and reading layers is increased, there is the problem in that seek operation before reading takes a considerable amount of time.

Another problem is that, to perform recording, all the recording and reading layers must be consulted to identify which addresses in which recording and reading layer can be used for recording, and therefore preparation for recording takes a considerable amount of time.

SUMMARY OF THE INVENTION

The present invention has been made in view of the above problems, and it is an object of the invention to provide a technique for reducing seek time during reading and recording in an optical recording medium including a servo layer and recording and reading layers by quickly acquiring the necessary information of the recording and reading layers.

The present inventors have made extensive studies, and the above object is achieved by the following means.

To achieve the above object, the present invention provides an optical recording and reading method of recording and reading information on and from an optical recording medium including a plurality of recording and reading layers having a flat structure with no projection and depression for tracking control and a servo layer having a projection and a depression for tracking control formed thereon, the information being recorded on or read from the plurality of recording and reading layers by irradiating one of the plurality of recording and reading layers with a recording and reading beam while the servo layer is irradiated with a servo beam to perform tracking control, the method comprising: when recording of information is performed on any of the plurality of recording and reading layers, recording control information on the servo layer, the control information being necessary for subsequent recording and reading to be performed on any of the plurality of recording and reading layers; and, when the subsequent recording or reading is performed on any of the plurality of recording and reading layers, consulting the control information recorded on the servo layer.

In the optical recording and reading method provided to achieve the above object, the control information recorded on the servo layer includes at least one of information of contents recorded on the plurality of recording and reading layers, error information, and additional information.

In the optical recording and reading method provided to achieve the above object, the control information is recorded on the servo layer using the servo beam used for the tracking control using the servo layer.

In the optical recording and reading method provided to achieve the above object, the control information is recorded on the servo layer using the recording and reading beam used for recording and reading performed on the plurality of recording and reading layers.

In the optical recording and reading method provided to achieve the above object, a wavelength of the recording and reading beam is set to be substantially equal to a wavelength of the servo beam.

In the optical recording and reading method provided to achieve the above object, the wavelength of the recording and reading beam is set to be shorter than the wavelength of the servo beam.

In the optical recording and reading method provided to achieve the above object, the servo layer is disposed farther from a light incident surface of the optical recording medium than the plurality of recording and reading layers, and the plurality of recording and reading layers have light transmitting properties that allow the servo beam to pass therethrough. The servo layer is irradiated with the servo beam passing through the plurality of recording and reading layers to perform the tracking control.

In the optical recording and reading method provided to achieve the above object, an interlayer distance between the servo layer and one of the plurality of recording and reading layers that is adjacent to the servo layer is set to be equal to any one of interlayer distances between the plurality of recording and reading layers.

In the optical recording and reading method provided to achieve the above object, a track pitch of the servo layer is set to twice the recording track pitch of the plurality of recording and reading layers to be recorded.

In the optical recording and reading method provided to achieve the above object, the servo layer is disposed closer to a light incident surface of the optical recording medium than the plurality of recording and reading layers, and the servo layer has light transmitting properties that allow the recording and reading beam to pass therethrough. The plurality of recording and reading layers are irradiated with the recording and reading beam passing through the servo layer to perform recording or reading.

To achieve the above object, the present invention provides an optical recording medium including: a plurality of recording and reading layers having a flat structure with no projection and depression for tracking control; and a servo layer having a projection and a depression for tracking control formed thereon, wherein information is recorded on the plurality of recording and reading layers while the tracking control is performed using the servo layer. The servo layer has a servo-side control information recording area on which, when recording of information is performed on any of the plurality of recording and reading layers, control information necessary for subsequent recording and reading to be performed on any of the plurality of recording and reading layers is recorded.

In the optical recording medium provided to achieve the above object, the control information recordable on the servo-side control information recording area includes at least one of information of contents recorded on the plurality of recording and reading layers, error information, and additional information.

According to the present invention, the necessary information of the recording and reading layers can be acquired quickly, and therefore seek time during reading and recording can be reduced.

BRIEF DESCRIPTION OF THE DRAWINGS

FIG. 3 is an enlarged perspective view of a part of a servo layer in the optical recording medium;

DETAILED DESCRIPTION OF THE PREFERRED EMBODIMENTS

Preferred embodiments of the present invention will next be described with reference to the accompanying drawings.

Figure 1:
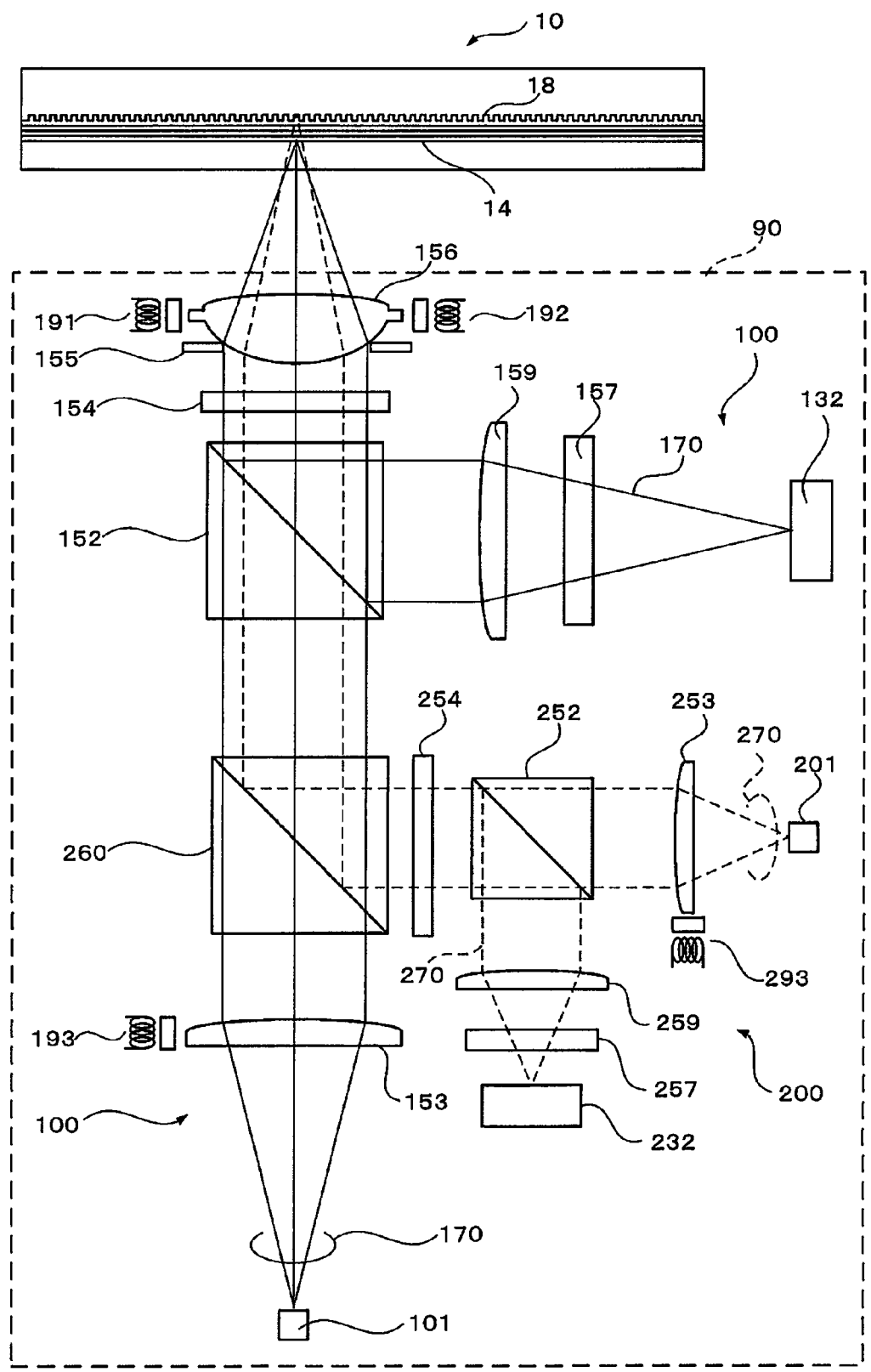
FIG. 1 is a block diagram illustrating the structure of an optical pickup used to record and read an optical recording medium according to an embodiment of the present invention.

FIG. 1 shows the structure of an optical recording medium 10 according to an embodiment and the structure of an optical pickup 90 used to record and read the first optical recording medium 10. The optical pickup 90 includes a first optical system 100 and a second optical system 200. The first optical system 100 is used to record and read a recording and reading layer group 14 in the optical recording medium 10. The second optical system 200 is used for tracking control using a servo layer 18 (described later) when information is recorded on the recording and reading layer group 14 using the first optical system 100.

A diverging beam 170 emitted from a light source 101 of the first optical system 100 and having a relatively short blue wavelength (380 to 450 nm, 405 nm in this optical pickup) passes through a collimating lens 153 provided with spherical aberration correction means 193 and through a wavelength selection filter 260 of the second optical system 200 and enters a polarizing beam splitter 152. The beam 170 entering the polarizing beam splitter 152 passes therethrough and then through a ¼ wavelength plate 154 and is thereby converted to a circularly polarized beam. The circularly polarized beam is then converted to a converging beam through an objective lens 156. The resultant beam 170 is focused on one of a plurality of recording and reading layers in the recording and reading layer group 14 formed in the optical recording medium 10.

The aperture of the objective lens 156 is restricted by an aperture stop 155 to set the numerical aperture NA to 0.70 to 0.90 (0.85 in this optical pickup). The beam 170 reflected from, for example, the recording and reading layer group 14 passes through the objective lens 156 and then through the ¼ wavelength plate 154 and is thereby converted to a linearly polarized beam with the polarization plane rotated 90° relative to that in the outward path. Then, the resultant beam is reflected from the polarizing beam splitter 152. The polarizing beam splitter 152 has wavelength selectivity. More specifically, the polarizing beam splitter 152 allows the beam 170 from the light source 101 of the first optical system 100 to be reflected therefrom but always transmits a beam 270 (described later) emitted from the second optical system 200 and having a relatively long red wavelength.

The beam 170 reflected from the polarizing beam splitter 152 passes through a condensing lens 159 and is thereby converted to a converging beam. The converging beam passes through a cylindrical lens 157 and is incident on a photodetector 132. When the beam 170 passes through the cylindrical lens 157, astigmatism is given to the beam 170.

The photodetector 132 has four light receiving units (not shown), and each of the light receiving units outputs a current signal according to the amount of light received. The current signals are used to generate a focus error (hereinafter abbreviated as FE) signal using the astigmatic method, a tracking error (hereinafter abbreviated as TE) signal using the push-pull method (the TE signal is generated only during reading), a reading signal of information recorded on the optical recording medium 10, and other signals. The FE and TE signals are amplified to desired levels, subjected to phase compensation, and then supplied to actuators 191 and 192 as feedback to perform focus control and tracking control. The tracking control by the first optical system 100 is used only for reading.

The diverging beam 270 emitted from a light source 201 of the second optical system 200 and having a red wavelength of 630 to 680 nm (650 nm in this optical pickup) passes through a collimating lens 253 provided with spherical aberration correction means 293 and enters a polarizing beam splitter 252. The beam 270 entering the polarizing beam splitter 252 passes therethrough and then through a ¼ wavelength plate 254 for the second optical system and is thereby converted to a circularly polarized beam. The circularly polarized beam is reflected from the wavelength selection filter 260 and passes through the polarizing beam splitter 152, which is shared with the first optical system 100. The beam 270 is then converted to a converging beam through the objective lens 156. The resultant beam 270 is focused on the servo layer 18 formed in the first optical recording medium 10. The beam 270 reflected from the servo layer 18 passes through the objective lens 156 and then through the polarizing beam splitter 152 and is reflected from the wavelength selection filter 260 of the second optical system 200. The reflected beam 270 passes through the ¼ wavelength plate 254 and is thereby converted to a linearly polarized beam with the polarization plane rotated 90° relative to that in the outward path. Then, the resultant beam is reflected from the polarizing beam splitter 252. The beam 270 reflected from the polarizing beam splitter 252 passes through a condensing lens 259 and is thereby converted to a converging beam. The converging beam passes through a cylindrical lens 257 and is then incident on a photodetector 232. When the beam 270 passes through the cylindrical lens 257, astigmatism is given to the beam 270.

The photodetector 232 has four light receiving units (not shown), and each of the light receiving units outputs a current signal according to the amount of light received. The current signals are used to generate a focus error (FE) signal using the astigmatic method and a tracking error (TE) signal using the push-pull method. If information is recorded also on the first servo layer 18, a reading signal is also generated.

When information is recorded on the recording and reading layer group 14 using the first optical system 100, the TE signal from the second optical system 200 is amplified to a desired level, subjected to phase compensation, and then supplied to the actuators 191 and 192 as feedback to perform tracking control. Therefore, the first optical system 100 records information on the recording and reading layer group 14 under the tracking control by the second optical system 200. In the present embodiment, when information recorded on the recording and reading layer group 14 is read, the first optical system 100 itself performs tracking control using recording marks on the recording and reading layer group 14. Of course, the information can be read under tracking control by the second optical system 200.

Figure 2:
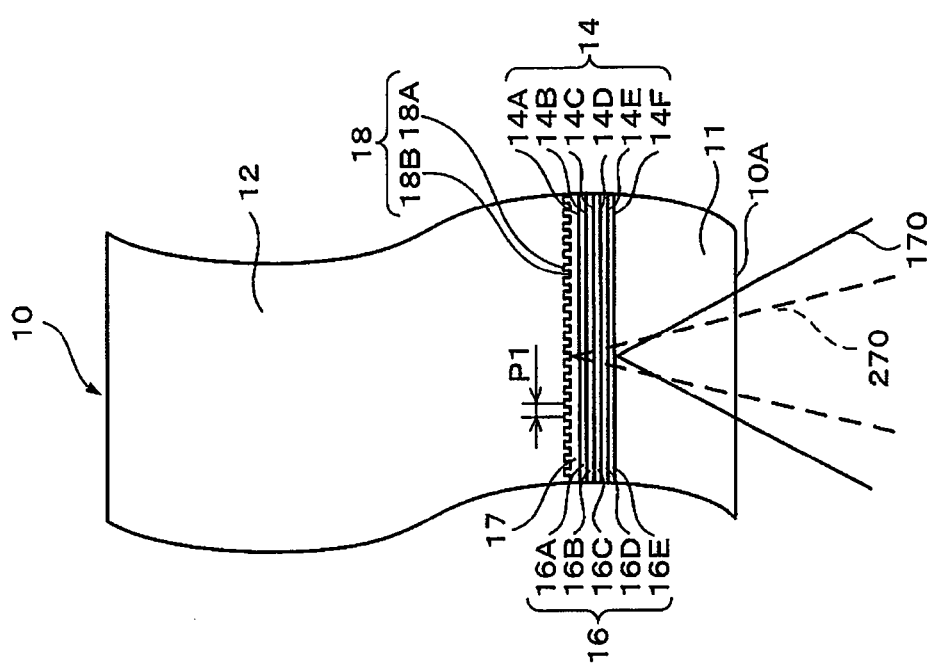
FIG. 2 is a cross-sectional view illustrating the stacking structure of the optical recording medium.

FIG. 2 shows the enlarged cross-sectional structures of the optical recording medium 10 according to the present embodiment.

The optical recording medium 10 has a disc shape having an outer diameter of approximately 120 mm and a thickness of approximately 1.2 mm. The optical recording medium 10 includes, in order from a light incident surface 10A, a cover layer 11, the recording and reading layer group 14, an intermediate layer group 16, a spacer layer 17, the servo layer 18, and a support substrate 12.

In this embodiment, the recording and reading layer group 14 includes first to sixth recording and reading layers 14A to 14F, and information can be recorded on each recording and reading layer. Each of the first to sixth recording and reading layers 14A to 14F has a flat structure with no projection and depression for tracking control. When any of the first to sixth recording and reading layers 14A to 14F is irradiated with the high-energy recording beam 170 emitted from the first optical system 100, recording marks are formed. The types of the recording and reading layers in the recording and reading layer group 14 include a write-once type in which information can be additionally written but the written information is not rewritable and a rewritable type in which information is rewritable.

The support substrate 12 is a disc-shaped substrate having a diameter of 120 mm and a thickness of 1.0 mm, which is employed to ensure the thickness required for the optical recording medium (about 1.2 mm). The servo layer 18 is formed on a surface of the support substrate 12 that is on the side toward the light incident surface 10A. More specifically, a spiral land 18A and a spiral groove 18B are formed on the support substrate 12 on the side toward the light incident surface 10A so as to extend from the vicinity of its center toward its outer edge. The land 18A and groove 18B serve as a projection and a depression (recess) for tracking control, and the beam 270 from the second optical system 200 is guided by The land 18A and groove 18B.

Various materials can be used as the material for the support substrate 12. For example, glass, ceramic, and resin can be used. It is preferable to use a resin because of its good moldability. Example of the resin include polycarbonate resins, olefin resins, acrylic resins, epoxy resins, polystyrene resins, polyethylene resins, polypropylene resins, silicone resins, fluorine-based resins, ABS resins, and urethane resins. Of these, polycarbonate resins and olefin resins are particularly preferred because of their processability. The support substrate 12 does not serve as an optical path of the beam 270 and therefore need not have high light transmittance.

The servo layer 18 formed on the support substrate 12 is constituted by a recording layer formed on the surface of the support substrate 12. Therefore, the servo layer 18 is a recording layer having a projection and a depression (the land 18A and the groove 18B) for tracking control. When the second optical system 200 irradiates the servo layer 18 with a high-energy beam 270, the chemical or physical properties of the irradiated areas are changed to cause the light reflectance to be changed, and information is thereby recorded. The servo layer 18, of course, functions as a light reflecting film for tracking control. No particular limitation is imposed on the type of the recording layer. A recording layer that uses, for example, an inorganic material or an organic dye material may be used. Any method for the write once type or the rewritable type may be appropriately used as the recording method for the recording layer.

A servo-side control information recording area for recording control information necessary for recording and reading to be performed on the recording and reading layer group 14 is formed in the servo layer 18. The control information recorded on the servo-side control information recording area, after information is recorded on the recording and reading layer group 14, includes information necessary for subsequent recording and reading to be performed on the recording and reading layer group 14. Examples of the control information include additional information such as the information of the contents recorded on the recording and reading layer group 14 and error information during data recording. In particular, the information included in the control information contains items indicating that this information relates to which recording and reading layer in the recording and reading layer group 14. Therefore, when recording or reading is performed subsequently, the servo-side control information recording area in the servo layer 18 is consulted, and this allows the state of any of the recording and reading layers to be quickly detected.

In addition, the servo layer 18 may have a servo-side data recording area separately from the servo-side control information recording area. The servo-side data recording area can be used similarly to the recording and reading layer group 14 to record general data.

The control information and other information are recorded on the servo layer 18 by irradiating the land 18A and/or the groove 18B on the servo layer 18 with the beam 270 in the red wavelength range from the second optical system 200 while the servo layer 18 is tracked with this beam 270. The recording pitch for the servo layer 18 may be the same as the recording pitch for the recording and reading layer group 14. Of course, recording is performed by irradiating the land 18A and the groove 18B on the servo layer 18 with the recording beam 170 in the blue wavelength range from the first optical system 100.

The track pitch P1 of the land 18A and the groove 18B on the servo layer 18 is set to less than 0.74 μm in this embodiment. The track pitch P1 is the distance between adjacent parts of the land 18A or adjacent parts of the groove 18B. More specifically, the track pitch P1 is set preferably within the range of 0.6 μm to 0.7 μm and more preferably to about 0.64 μm.

However, the track pitch P2 of the recording marks recorded on the recording and reading layers 14A to 14F is set to one-half (½) the track pitch P1 of the land 18A and the groove 18B. More specifically, the track pitch P2 of the recording marks is set to less than 0.37 μm, preferably within the range of 0.30 μm to 0.35 μm, and more preferably to about 0.32 μm.

Therefore, the recording track pitch P2 of the recording and reading layers 14A to 19F is about 0.32 μm that is compatible with the BD standard. The track pitch P1 (about 0.64 μm) of the land 18A/groove 183 of the servo layer 18 allows sufficient tracking with the beam 270 in the relatively long red wavelength range. As will be described later in detail, tracking is performed using both the land 18A and the groove 18B in the present embodiment. This causes the track pitch P2 of the recording marks recorded on the recording and reading layers 14A to 14F to be about 0.32 μm, which is one-half of the track pitch 21 of the servo layer 18. Therefore, the track pitch of the recording marks on the recording and reading layer group 14 can be halved without reducing the track pitch of the servo layer 18, and the recording capacity can thereby be increased easily.

Basic information (including the address information of the recording and reading layer group 14, recording conditions such as a recording and reading power, the interlayer distances between or the positions of the recording and reading layers 14A to 14F, and other information) that should be pre-stored during manufacturing of the medium is pre-recorded on the servo layer 18. As enlarged in FIG. 3, the land 18A or the groove 18B has a wobble 18W so as to extend in a sinusoidal form vibrating in the radial direction with a predetermined period. Address information and a timing clock are embedded in the land 18A or the groove 18B by use of the changes in phase of the wobble 18W. As will be described later in detail, the land 18A, the groove 18B, and the wobble 18W are formed simultaneously when the support substrate 12 is formed by injection molding. In this embodiment, the basic information is pre-recorded on the servo layer 18 by using the wobble 18W or the like, but the present invention is not limited thereto. The basic information may be embedded in the servo layer 18 during manufacturing using any other method. Recording marks 18F corresponding to the control information are formed on both the land 18A and the groove 18B serving as the servo-side control information recording area, as described above.

The spacer layer 17 is formed of a light-transmitting ultraviolet curable acrylic resin, and the thickness thereof is set to 90 μm in this embodiment.

Each of the first to sixth recording and reading layers 14A to 14F formed on the spacer layer 17 on the side toward the light incident surface 10A has a three-film structure (not shown) including a write once-type recording film and dielectric films stacked on opposite sides thereof. Each of the first to sixth recording and reading layers 14A to 14F has light reflectance, absorbance, transmittance, and other properties optimized for the beam 170 in the blue wavelength range (short wavelength range) from the first optical system 100 and allows sufficient transmission of the beam 270 in the red wavelength range (long wavelength range) from the second optical system 200.

The dielectric films in each recording and reading layer have a basic function of protecting the write once type recording film and also play a role in increasing the differences in optical properties before and after the formation of recording marks.

When the beam 170 is applied, the recording sensitivity is likely to decrease if the energy absorbed by the dielectric films is large. To prevent the reduction in the recording sensitivity, it is preferable to select a material having a low absorption coefficient (k) for the wavelength range of 380 nm to 450 nm (particularly at 405 nm) as the material for the dielectric films. In this embodiment, $TiO_2$ is used as the material for the dielectric films.

The write once type recording film sandwiched between the dielectric films is used to form irreversible recording marks, and the regions in which the recording marks have been formed have a reflectance for the beam 170 significantly different from that of the other regions (blank regions). The recording and reading of data are thereby achieved. Also the write once type recording film has high transmittance for the tracking beam 270 in the red wavelength range from the second optical system 200.

The write once type recording film is formed mainly of a material containing Bi and O. The write once type recording film functions as an inorganic reactive film, and its reflectance is largely changed chemically or physically by the heat of a laser beam. Preferred examples of the material for the write once type recording film include materials containing Bi and O as main components and materials containing Bi, M, and O as main components (wherein M is at least one element selected from among Mg, Ca, Y, Dy, Ce, Tb, Ti, Zr, V, Nb, Ta, Mo, W, Mn, Fe, Zn, Al, In, Si, Ge, Sn, Sb, Li, Na, K, Sr, Ba, Sc, La, Nd, Sm, Gd, Ho, Cr, Co, Ni, Cu, Ga, and Pb). In the present embodiment, Bi—Ge—O is used as the material for the write once type recording film.

In the above description, the write once type recording film is used for each of the first to sixth recording and reading layers 14A to 14F. However, a phase change recording film that allows repeated recording can be used. In such a case, it is preferable to use SbTeGe as the main components of the phase change recording film.

The intermediate layer group 16 includes first to fifth intermediate layers 16A to 16E that are stacked in that order from the side away from the light incident surface 10A and disposed between the first to sixth recording and reading layers 14A to 14F. Each of the intermediate layers 16A to 16E is formed of an ultraviolet curable acrylic or epoxy resin. The thicknesses of the intermediate layers 16A to 16E are 16 μm for the first intermediate layer 16A, 12 μm for the second intermediate layer 16B, 16 μM for the third intermediate layer 16C, 12 μm of the fourth intermediate layer 16D, and 16 μm for the fifth intermediate later 16E. More specifically, two types of intermediate layers having different thicknesses (16 μm and 12 μm) are stacked alternately. Therefore, the interlayer distances between adjacent ones of the first to sixth recording and reading layers 14A to 14F are set alternately to a first distance (16 μm) and a second distance (12 μm) different from the first distance in sequence from the light incident surface side. The difference between the first and second distances is set to 4 μm.

As in the intermediate layer group 16, the cover layer 11 is formed of a light-transmitting ultraviolet curable acrylic resin, and the thickness thereof is set to 38 μm.

Since the optical recording medium 10 is configured as described above, the servo layer 18 is positioned at a distance of 0.2 mm (200 μm) from the light incident surface 10A. In the recording and reading layer group 14, the first recording and reading layer 14A, which is farthest from the light incident surface 10A, is positioned at a distance of 0.11 mm (110 μm) from the light incident surface 10A, and the sixth recording and reading layer 14F, which is closest to the light incident surface 10A, is positioned at a distance of 38 μm from the light incident surface 10A. The total thickness of the recording and reading layer group 14 (the distance from the first recording and reading layer 14A to the sixth recording and reading layer 14F) is 72 μm.

In the optical recording medium 10 in the present embodiment, the servo layer 18 is disposed at a position farther from the light incident surface 10A than the recording and reading layer group 14. In this configuration, the adverse influence of the land 18A and groove 18B for tracking control on the recording and reading beam 170 projected onto the recording and reading layer group 14 can be reduced.

A method of manufacturing the first optical recording medium 10 in the present embodiment will next be described.

First, a support substrate 12 having a land 18A and a groove 18B formed thereon is produced by injection molding a polycarbonate resin and using a metal stamper. The basic information (including the address information of the recording and reading layer group 14, recording conditions such as a recording and reading power, the interlayer distances between or the positions of the recording and reading layers 14A to 14F, and other information) that should be pre-stored during manufacturing of the medium is pre-recorded on the support substrate 12 using the die for the injection molding. More specifically, the wobble 18W of the land 18A or the groove 18B is used to pre-record the basic information. The method of producing the support substrate 12 is not limited to injection molding, and any other method such as a 2P method may be used.

Next, the servo layer 18 is formed on the surface of the support substrate 12 on which the groove and land have been formed. The servo layer 18 is formed by forming a recording layer of, for example, an inorganic material by sputtering or any other method. Then the spacer layer 17 is formed on the servo layer 18. To form the spacer layer 17, for example, a coating of an ultraviolet curable acrylic or epoxy resin having a controlled viscosity is formed by, for example, spin coating and then irradiated with ultraviolet rays to cure the resin. The spacer layer 17 may be formed by applying, instead of the ultraviolet curable resin, a light-transmitting sheet of a light-transmitting resin to the servo layer 18 with, for example, an adhesive. The servo layer 18 is thereby provided with a servo-side control information recording area used to record the control information necessary for recording and reading.

Next, the first recording and reading layer 14A is formed. More specifically, a dielectric film, a write once type recording film, and another dielectric film are formed in that order by vapor deposition. In particular, sputtering is preferably used. Next, the first intermediate layer 16A is formed on the first recording and reading layer 14A. To form the first intermediate layer 16A, for example, a coating of an ultraviolet curable resin having a controlled viscosity is formed by, for example, spin coating and then irradiated with ultraviolet rays to cure the resin. The above procedure is repeated to sequentially stack the second recording and reading layer 14B, the second intermediate layer 16B, and so on.

After completion of the formation of the sixth recording and reading layer 14F, the cover layer 11 is formed thereon, and the first optical recording medium 10 is thereby completed. To form the cover layer 11, for example, a coating of an ultraviolet curable acrylic or epoxy resin having a controlled viscosity is formed by, for example, spin coating and then irradiated with ultraviolet rays to cure the resin. In the present embodiment, the manufacturing method described above is used. However, the present invention is not limited to the manufacturing method described above, and other manufacturing techniques may be used.

Figure 4B:
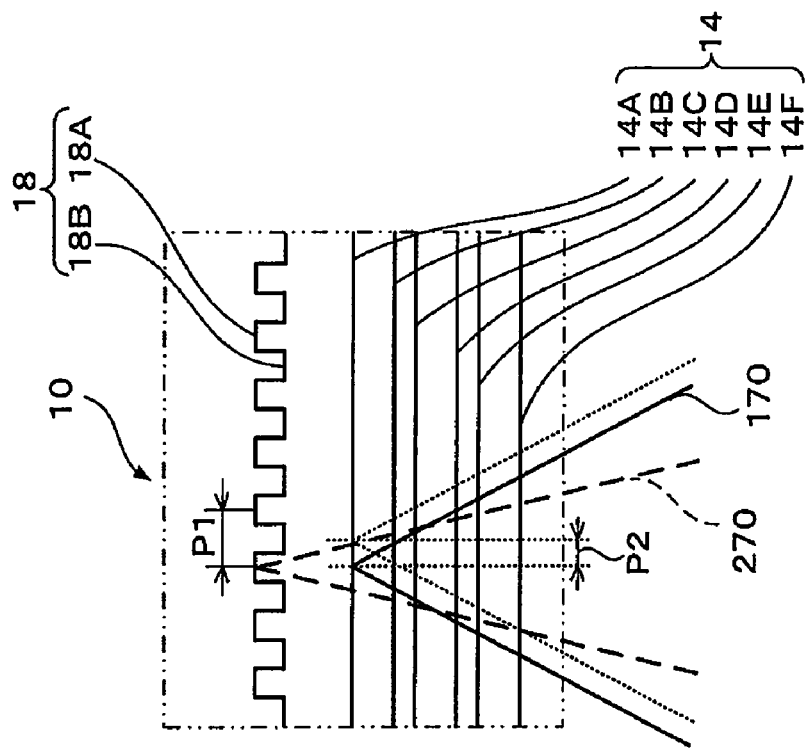
FIGS. 4A and 4B are enlarged cross-sectional views illustrating the stacking structure of the optical recording medium and a recording procedure.
Figure 4A:
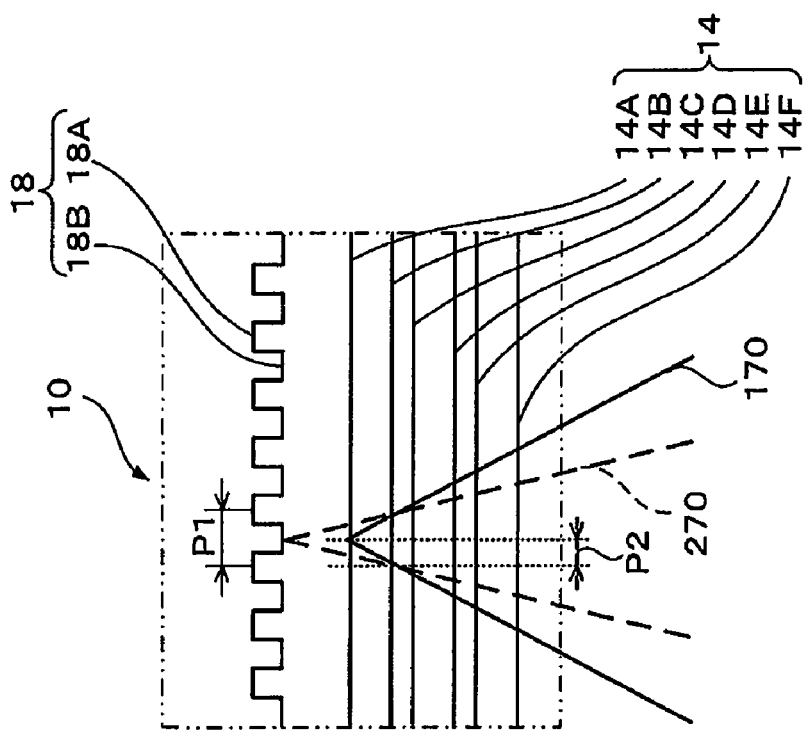

Next, an optical recording and reading method of recording and reading information on/from the first optical recording medium 10 using the optical pickup 90 will be described with reference to FIGS. 4A and 4B.

To record information on the optical recording medium 10, first, the servo layer 18 is irradiated with the recording beam 270 in the red wavelength range from the second optical system 200 to read the control information recorded on the servo-side control information recording area. The optical pickup 90 can thereby obtain the information necessary for recording and reading data on/from the recording and reading layer group 14. More specifically, the information of the power of the beam 170, the positional information of the recording and reading layer group 14, the rule of the interlayer distances therein, address information, content information, error information, additional information, and other information can be obtained for each of the recording and reading layers 14A to 14F at once. Therefore, when information is added, it can be identified in advance that information should be recorded on which recording and reading layer at which location thereof. In the following description, it is assumed that information is added to the first recording and reading layer 14A.

The first recording and reading layer 14A is then irradiated with the recording beam 170 in the blue wavelength range from the first optical system 100. Simultaneously, the servo layer 18 is irradiated with the beam 270 in the red wavelength range from the second optical system 200 to perform tracking. More specifically, as shown in FIGS. 4A and 4B, the spot of the beam 270 is projected onto the land 18A (see FIG. 4B) or the groove 18B (see FIG. 4A) of the servo layer 18 to perform tracking. Therefore, information can be recorded on the first recording and reading layer 14A while tracking is performed using both the land 18A and groove 18B of the servo layer 18. Accordingly, the track pitch P2 of the recording marks recorded on the first recording and reading layer 14A is one-half of the track pitch P1 of the servo layer 18.

After completion of the recording of the necessary information, the control information of the recording and reading layer including the additional information for the current recording process (such as the address information, content information, and error information for recording) is recorded on the servo-side control information recording area in the servo layer 18 to complete the process. This control information will be consulted when recording or reading is performed subsequently. The recording on the servo layer 18 is performed with the red beam 270 while this red beam 270 is used to perform tracking. Although not shown in the drawings, the servo layer may be irradiated with the blue beam 170 to perform tracking. In this case, the control information is recorded on the servo layer with this blue beam 170. One of the land 18A and the groove 18B may be used to record the control information. However, both the land 18A and the groove 18B may be used, as shown in FIG. 3.

To read the information recorded on the first recording and reading layer 14A, first, the servo layer 18 is irradiated with the recording beam 270 in the red wavelength range from the second optical system 200 to read the control information previously recorded (for example, the additional information, such as the content information, which has been recorded on the first recording and reading layer 14A). Therefore, since the information of the contents to be read and other information can be obtained from the servo layer 18 in advance, the fact that the contents to be read have been recorded on the first recording and reading layer 14A can be known in advance.

Then the beam 170 from the first optical system 100 is used to access to a predetermined address in the first recording and reading layer 14A, and reading is thereby performed. Since it is apparent that the information has already been recorded on the first recording and reading layer 14A, tracking during reading can be performed using the light reflected from the recording marks for the information. Therefore, when the contents are being read, the beam 270 from the second optical system 200 is not needed.

In the optical recording medium 10 and the optical recording and reading method in the present embodiment described above, when information is recorded on the recording and reading layer group 14, the control information necessary for subsequent recording and reading to be performed on the recording and reading layer group 14 can be recorded on the servo-side control information recording area in the servo layer 18. Therefore, by consulting the control information recorded on the servo layer 18 when the subsequent recording or reading is performed, the information of the contents recorded on each recording and reading layer, the error information during recording and reading, and other information can be acquired for each of the recording and reading layers 14A to 14F at once. This can improve the recording and reading efficiency as compared with that when a seek is preformed for the recording and reading layers independently.

Moreover, the servo layer 18 provided mainly for the purpose of tracking control can be used as the servo-side control information recording area. Therefore, the control information need not be recorded on the recording and reading layer group 14, and the data areas on the recording and reading layer group 14 can thereby be effectively used. In addition, areas other than the servo-side control information recording area in the servo layer 18 can be used as servo-side data recording areas similar to the data recording areas in the recording and reading layer group 19, and the recording capacity can thereby be increased.

The basic information, such as the address information of the recording and reading layer group 14 and recording conditions, are pre-recorded on the servo layer 18 using the wobble 18W. Therefore, since the basic information as well as the control information can be acquired from the servo layer 18, the seek time before recording or reading can be further reduced.

In the present embodiment, the red servo beam 270 is used to record the control information on the servo layer 18. Therefore, after completion of recording operation on the recording and reading layer group 14 under tracking control using the red beam 270, the red beam 270 itself can be used to quickly record the control information on the servo layer 18.

In the present embodiment, tracking is performed with the long-wavelength servo beam 270 using both the land 18A and groove 18B on the servo layer 18. Therefore, recording on the recording and reading layer group 14 can be performed at a recording pitch of one-half of the track pitch P1 of the servo layer 18.

For example, when the wavelength of the beam 270 used for the servo layer 18 is set within the range of 630 nm to 680 nm which is in the red wavelength range and the wavelength of the recording and reading beam 170 is set within the range of 380 nm to 450 nm which is in the blue wavelength range, high density recording can be achieved.

For example, the track pitch P1 of the land 18A and the groove 18B is preferably set to 0.6 µm to 0.7 µm (more specifically about 0.64 µm). This allows the track pitch P2 in the recording and reading layer group 14 to be set to 0.30 µm to 0.35 µm (more specifically about 0.32 µm) to conform to the BD standard.

Preferably, the track pitch in the servo layer 18 is set to 0.64 µm. This allows existing products for the DVD standard to be used as the second optical system 200 with almost no change. Since the recording and reading layer group 14 has a track pitch of 0.32 µm, existing products for the BD standard can be used as the first optical system 100 with almost no change. Therefore, no additional development expense is required for the optical pickup 90, and existing parts can be effectively used for the inventive recording medium series.

In the present embodiment, the servo layer 18 is disposed farther from the light incident surface than the recording and reading layer group 14, and the servo layer 18 is irradiated with the red beam 270 passing through the recording and reading layer group 14 to perform tracking. In this configuration, it is only required to previously form the land 18A and the groove 18B on the support substrate 12 when the optical recording medium 10 is produced, and the manufacturing cost can thereby be reduced significantly.

In the description of the optical recording medium 10 in the present embodiment, the servo layer 18 is disposed farther from the light incident surface 10A than the recording and reading layer group 14, but the invention is not limited thereto. In the above description, the number of the recording and reading layers in the recording and reading layer group 14 is six or more, but the invention is not limited thereto. Also in the present embodiments, the groove and land adapted to the specifications of the red wavelength servo beam 270 are formed on the servo layer 18, but the invention is not limited thereto.

Figure 5:
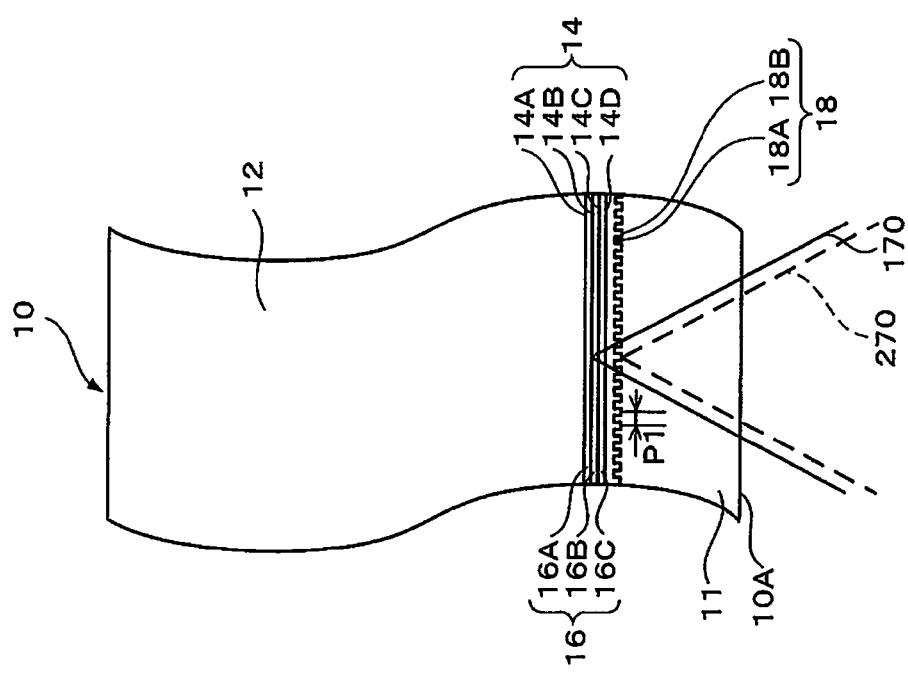
FIG. 5 is a cross-sectional view illustrating the stacking structure of the optical recording medium according to another embodiment of the present invention.

FIG. 5 shows an optical recording medium 10 according to another embodiment. In this optical recording medium 10, a servo layer 18 is disposed closer to a light incident surface 10A than a recording and reading layer group 14 having a four-layer structure, and the land 18A and groove 18B of the servo layer 18 are formed to meet the standard that allows tracking control to be performed with a blue wavelength servo beam 270. In this optical recording medium 10, the servo layer 18 is formed of a recording layer similar to those in the recording and reading layer group 14, and tracking control, recording, and reading can be achieved with blue beams 270 and 170.

In the above configuration, the track pitch 21 of the land 18A and the groove 18B is set within the range of 0.30 µm to 0.35 µm. To record information on the recording and reading layer group 14, it is preferable to perform tracking using only one of the land 18A and the groove 18B with the blue servo beam 270. While the tracking is performed, the recording on the recording and reading layer group 14 is performed by irradiating the recording and reading layer group 14 with the blue recording and reading beam 170 passing through the servo layer 18. To record the control information on the servo layer 18, it is preferable to use one of the blue servo beam 270 and the blue recording and reading beam 170 to record the control information on only one of the land 18A and the groove 18B.

In the above configuration, since the servo layer 18 is disposed close to the light incident surface 10A, the accuracy of tracking can be improved.

In the present embodiments, two types of interlayer distances (16 μm and 12 μm) are set alternately in the recording and reading layer group, but the invention is not limited thereto. A combination of three or more different interlayer distances may be used.

In the present embodiments, the servo layer 18 is disposed 0.2 mm from the light incident surface 10A. However, the servo layer 18 may be disposed at a position more than 0.2 mm from the light incident surface 10A or at a position less than 0.2 mm. The servo layer 18 may be disposed at a position of 0.6 mm from the light incident surface 10A. In such a case, for example, the interlayer distance between the servo layer 18 and the first recording and reading layer 14A adjacent thereto may be equal to one of the interlayer distances in the recording and reading layer group 14 (i.e., 16 μm or 12 μm). In such a configuration, the servo layer 18 can be controlled as one of the recording and reading layer group 14. In the present embodiments, the red beam 270 is used for the servo layer 18 to perform tracking control and to record the control information. However, the blue beam 170 may be used instead. The use of the blue beam 170 allows a reduction in the size of recording marks. Therefore, the recording marks for the control information and other information can be formed on the land 18A and the groove 18B of the servo layer 18 with a sufficient margin.

In the present embodiments, the servo layer is disposed at a position farther from the light incident surface than the recording and reading layer group, but the invention is not limited thereto. The servo layer may be disposed closer to the light incident surface than the recording and reading layer group.

In the present embodiments, the beam 270 having a longer wavelength is in the red wavelength range, and the beam 170 having a shorter wavelength is in the blue wavelength range. However, the invention is not limited thereto. For example, two beams in the blue wavelength range may be used. More specifically, the beam having a longer wavelength may be used as the beam 270, and the beam having a shorter wavelength may be used as the beam 170.

The optical recording medium and the optical recording and reading method of the present invention are applicable to various optical recording media including a servo layer and recording and reading layers.

The entire disclosure of Japanese Patent Application No. 2010-035810 filed on Feb. 22, 2010 including specification, claims, drawings, and summary are incorporated herein by reference in its entirety.

What is claimed is:

1. An optical recording and reading method of recording and reading information on and from an optical recording medium including a plurality of recording and reading layers having a flat structure with no projection and depression for tracking control and a servo layer having a projection and a depression for tracking control formed thereon, the information being recorded on or read from the plurality of recording and reading layers by irradiating one of the plurality of recording and reading layers with a recording and reading beam while the servo layer is irradiated with a servo beam to perform tracking control, the method comprising:

when recording of information is performed on any of the plurality of recording and reading layers, recording control information on the servo layer, the control information being necessary for subsequent recording and reading to be performed on any of the plurality of recording and reading layers; and when the subsequent recording or reading is performed on any of the plurality of recording and reading layers, consulting the control information recorded on the servo layer using the recording and reading beam used for recording and reading performed on the plurality of recording and reading layers.

2. The optical recording and reading method according to claim 1, wherein the control information recorded on the servo layer includes at least one of information of contents recorded on the plurality of recording and reading layers, error information, and additional information.

3. The optical recording and reading method according to claim 1, wherein the control information is recorded 30 on the servo layer using the servo beam used for the tracking control using the servo layer.

4. An optical recording and reading method of recording and reading information on and from an optical recording medium including a plurality of recording and reading layers having a flat structure with no projection and depression for tracking control and a servo layer having a projection and a depression for tracking control formed thereon, the information being recorded on or read from the plurality of recording and reading layers by irradiating one of the plurality of recording and reading layers with a recording and reading beam while the servo layer is irradiated with a servo beam to perform tracking control, the method comprising:

when recording of information is performed on any of the plurality of recording and reading layers, recording control information on the servo layer, the control information being necessary for subsequent recording and reading to be performed on any of the plurality of recording and reading layers; and when the subsequent recording or reading is performed on any of the plurality of recording and reading layers, consulting the control information recorded on the servo layer and wherein a wavelength of the recording and reading beam is set to be substantially equal to a wavelength of the servo beam.

5. The optical recording and reading method according to claim 1, wherein a wavelength of the recording and reading beam is set to be shorter than a wavelength of the servo beam.

6. The optical recording and reading method according to claim 1, wherein the servo layer is disposed farther from a light incident surface of the optical recording medium than the plurality of recording and reading layers, and the plurality of recording and reading layers have light transmitting properties that allow the servo beam to pass therethrough; and the servo layer is irradiated with the servo beam passing through the plurality of recording and reading layers to perform the tracking control.

7. The optical recording and reading method according to claim 1, wherein the servo layer is disposed closer to a light incident surface of the optical recording medium than the plurality of recording and reading layers, and the servo layer has light transmitting properties that allow the recording and reading beam to pass therethrough; and the plurality of recording and reading layers are irradiated with the recording and reading beam passing through the servo layer to perform recording or reading.

8. The optical recording and reading method according to claim 1, wherein an interlayer distance between the servo layer and one of the plurality of recording and reading layers that is adjacent to the servo layer is set to be equal to any one of interlayer distances between the plurality of recording and reading layers.

9. The optical recording and reading method according to claim 1, wherein a track pitch of the servo layer is set to twice the recording track pitch of the plurality of recording and reading layers to be recorded.

10. An optical recording medium comprising:
   a plurality of recording and reading layers having a flat structure with no projection and depression for tracking control; and
   a servo layer having a projection and a depression for tracking control formed thereon, wherein
   information is recorded on the plurality of recording and reading layers with a recording and reading beam while the tracking control is performed using the servo layer with a servo beam,
   the servo layer has a servo-side control information recording area on which, when recording of information is performed on any of the plurality of recording and reading layers, control information necessary for subsequent recording and reading to be performed on any of the plurality of recording and reading layers is recorded;
   the control information is recorded on the servo side control information recording area using the recording and reading beam used for recording and reading performed on the plurality of recording and reading layers.

11. The optical recording medium according to claim 10, wherein the control information recordable on the servo-side control information recording area includes at least one of information of contents recorded on the plurality of recording and reading layers, error information, and additional information.

12. The optical recording and reading method according to claim 4, wherein the control information recorded on the servo layer includes at least one of information of contents recorded on the plurality of recording and reading layers, error information, and additional information.

13. The optical recording and reading method according to claim 4, wherein the control information is recorded on the servo layer using the servo beam used for the tracking control using the servo layer.

14. The optical recording and reading method according to claim 4, wherein the servo layer is disposed farther from a light incident surface of the optical recording medium than the plurality of recording and reading layers, and the plurality of recording and reading layers have light transmitting properties that allow the servo beam to pass therethrough; and
   the servo layer is irradiated with the servo beam passing through the plurality of recording and reading layers to perform the tracking control.

15. The optical recording and reading method according to claim 4, wherein the servo layer is disposed closer to a light incident surface of the optical recording medium than the plurality of recording and reading layers, and the servo layer has light transmitting properties that allow the recording and reading beam to pass therethrough; and
   the plurality of recording and reading layers are irradiated with the recording and reading beam passing through the servo layer to perform recording or reading.

16. The optical recording and reading method according to claim 4, wherein an interlayer distance between the servo layer and one of the plurality of recording and reading layers that is adjacent to the servo layer is set to be equal to any one of interlayer distances between the plurality of recording and reading layers.

17. The optical recording and reading method according to claim 4, wherein a track pitch of the servo layer is set to twice the recording track pitch of the plurality of recording and reading layers to be recorded.

* * * * *